(12) United States Patent
Ben-David et al.

(10) Patent No.: US 9,938,160 B2
(45) Date of Patent: Apr. 10, 2018

(54) FILTRATION APPARATUS

(71) Applicant: WLI TRADING LIMITED, Dublin (IE)

(72) Inventors: Jonathan Ben-David, Qingdao (CN); Heung Soon Kim, Qingdao (CN)

(73) Assignee: WLI TRADING LIMITED, Dublin (IE)

( * ) Notice: Subject to any disclaimer, the term of this patent is extended or adjusted under 35 U.S.C. 154(b) by 420 days.

(21) Appl. No.: 14/433,843

(22) PCT Filed: Sep. 25, 2013

(86) PCT No.: PCT/IB2013/058850
§ 371 (c)(1),
(2) Date: Apr. 6, 2015

(87) PCT Pub. No.: WO2014/053956
PCT Pub. Date: Apr. 10, 2014

(65) Prior Publication Data
US 2015/0274544 A1    Oct. 1, 2015

(30) Foreign Application Priority Data
Oct. 5, 2012    (GB) .................................. 1217863.8

(51) Int. Cl.
*B01D 29/96* (2006.01)
*C02F 1/32* (2006.01)
(Continued)

(52) U.S. Cl.
CPC .............. *C02F 1/003* (2013.01); *B01D 29/96* (2013.01); *B01D 2201/4007* (2013.01); *C02F 1/283* (2013.01); *C02F 1/32* (2013.01); *C02F 2103/02* (2013.01); *C02F 2201/004* (2013.01); *C02F 2201/005* (2013.01); *C02F 2201/006* (2013.01); *C02F 2307/10* (2013.01)

(58) Field of Classification Search
CPC ............ B01D 29/96; B01D 2201/4053; B01D 2201/4061; B01D 2201/4707; B01D 2201/4007; C02F 1/003; C02F 2307/10; C02F 2103/02; C02F 2201/006; C02F 2201/005; C02F 1/32; C02F 1/283; C02F 2201/004
USPC .................................................. 210/237–238
See application file for complete search history.

(56) References Cited

U.S. PATENT DOCUMENTS 2,731,155 A * 1/1956 James .................... B01D 29/15
                                                            210/470
4,558,479 A * 12/1985 Greskovics ........... E04H 4/1654
                                                            15/1.7
(Continued)

FOREIGN PATENT DOCUMENTS

EP       1 775 538 A2    4/2007

OTHER PUBLICATIONS

International Search Report and Written Opinion of corresponding PCT/IB2013/058850, dated Feb. 13, 2014, 13 pages.

*Primary Examiner* — David C Mellon
(74) *Attorney, Agent, or Firm* — Lewis Roca Rothgerber Christie LLP

(57) ABSTRACT

Liquid filtration apparatus, comprising a filter cartridge adapted to mount within a dispensing apparatus, the apparatus comprising a lever operated cam mechanism for locking and unlocking the cartridge into and out of place.

19 Claims, 5 Drawing Sheets

(51) Int. Cl.
*C02F 1/00* (2006.01)
*C02F 1/28* (2006.01)
*C02F 103/02* (2006.01)

(56) References Cited

U.S. PATENT DOCUMENTS

| | | | |
|---|---|---|---|
| 5,135,645 A | | 8/1992 | Sklenak et al. |
| 5,230,795 A | | 7/1993 | Yang |
| 5,863,425 A | * | 1/1999 | Herlehy ................ A47L 9/1427 15/1.7 |
| 5,947,462 A | * | 9/1999 | Roussel ................ B01D 35/30 210/232 |
| 2006/0032806 A1 | | 2/2006 | Parker |
| 2012/0132573 A1 | | 5/2012 | Lautzenheiser et al. |

* cited by examiner

FILTRATION APPARATUS

CROSS-REFERENCE TO RELATED APPLICATION(S)

This application is a National Phase Patent Application and claims priority to and the benefit of International Application Number PCT/IB2013/058850, filed on Sep. 25, 2013, which claims priority to and the benefit of GB Patent Application Number 1217863.8, filed on Oct. 5, 2012, the entire disclosures of which are incorporated herein by reference.

This invention relates to filtration apparatus. In particular, but not exclusively, it relates apparatus for filtering water or other fluid for dispensing in a water dispenser, water cooler or similar apparatus.

Solid filters, such as carbon filters, are often used as the first or only stage of filtration in water dispensers. Water is caused to pass through the carbon filter, which acts to remove particles and impurities. These filters require regular replacement, cleaning and/or maintenance.

It is often quite difficult to remove and replace the filtration element.

The present invention arose in an attempt to provide an improved filtering apparatus, and an easier way to remove and refit these filters into the water system.

According to the present invention there is provided liquid filtration apparatus, comprising a filter cartridge adapted to mount within a dispensing apparatus, the cartridge comprising a lever operated cam mechanism for locking and unlocking the cartridge into and out of place.

The lever preferably acts upon one or more deflectable tabs to cause these tabs to lock into and out of cooperating means on a dispenser. The lever is preferably actuated in one rotary direction to lock the cartridge in place relative to the dispenser and in the other rotary direction to unlock it for quick, easy removal.

The lever may also comprise a handle for lifting the cartridge into or out of positions.

The cartridge preferably comprises a fluid path for enabling fluid, when the cartridge is locked in position, to pass from the inlet of the housing and through the filter medium.

The apparatus may form part of a water dispenser. The dispenser may include other filtration and/or purification means and may include one or more ultraviolet (UV) sterilisation means.

According to the present invention in a further aspect there is provided a filter cartridge comprising a filter cartridge comprising means for receiving a filter medium, and a lever operated cam mechanism for locking and unlocking the cartridge into and out of place.

The cartridge may comprise one or more resiliently deflectable tabs including means for locking the tabs into position relative to a dispenser when acted upon by the cam lever.

According to the present invention in a further aspect there is provided a water dispenser adapted to receive a removable filter cartridge, comprising means for one or more recess means for receiving part of a resiliently deflectable tab formed on a cartridge and thereby lock the cartridge in place.

In a further aspect there is provided a filter cartridge for a water dispenser, comprising a lever acting as a cam to lock and unlock the cartridge in place relative to a housing, the lever also acting as a handle to lift the cartridge out of the housing when unlocked.

By use of a lever acting to lock and unlock the cartridge from a dispenser, a strong locking and unlocking can be achieved, with minimal user force.

The invention also has the benefit that only a single operation element (the lever) is required to lock and unlock the system and no additional space is needed for a locking mechanism. In addition, the use of locking tabs and cooperating recesses enables a desired relative position of a filter and dispenser housing always to be achieved.

Embodiments of the invention will now be described, by way of example only, with reference to the accompanying schematic drawings, in which.

Figure 1:
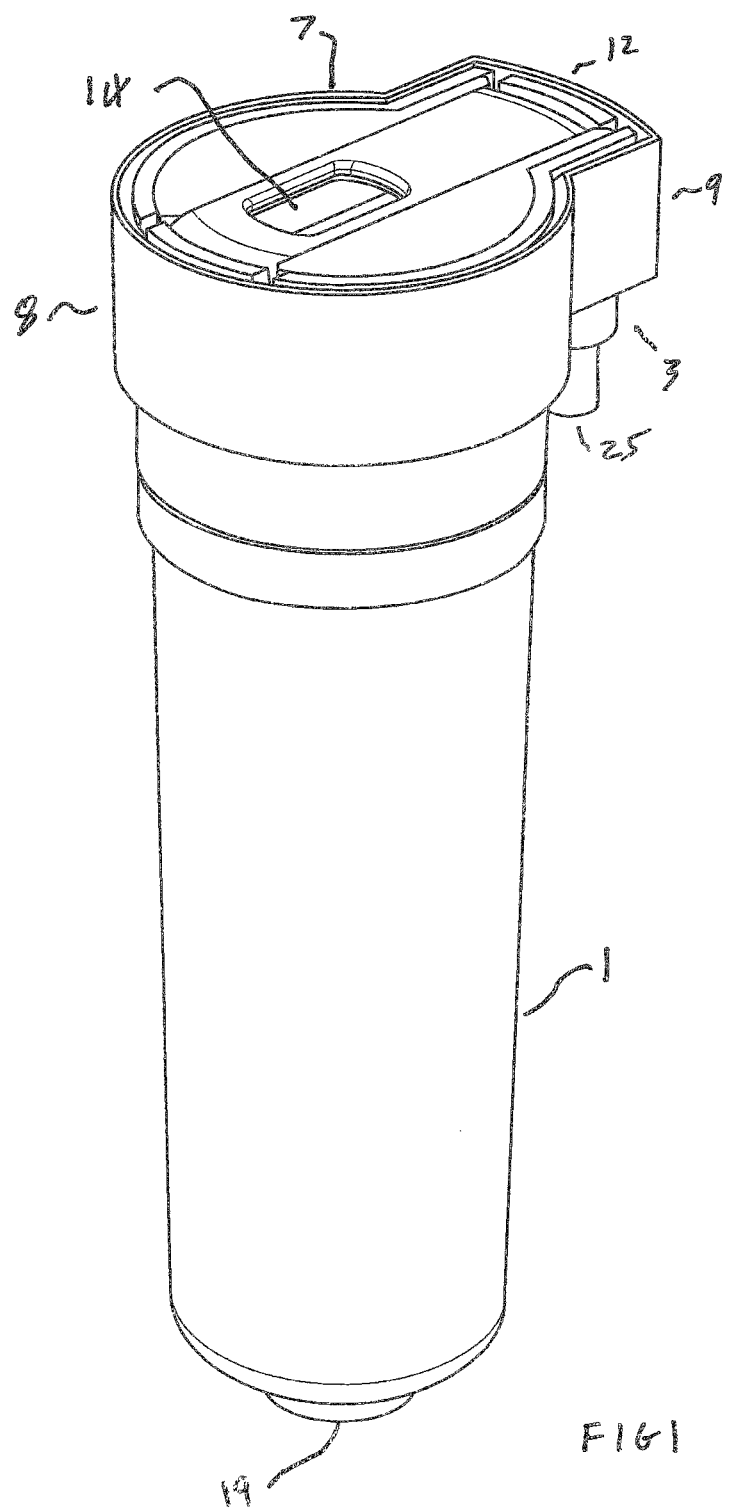
FIG. 1 shows a filter cartridge.

Referring to the figures, FIG. 1 shows a filter cartridge for a water dispenser. Note that where the term 'water' is used herein, the dispenser could equally be for other liquids if appropriate and the specification and claims are intended to cover this possibility.

Figure 3:
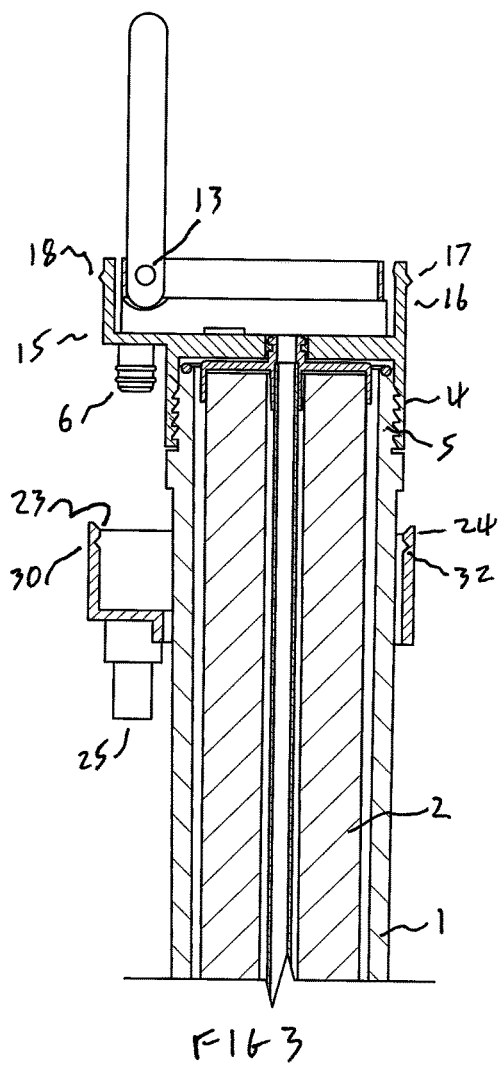
FIG. 3 shows a cross-section through a filter cartridge.
Figure 4:
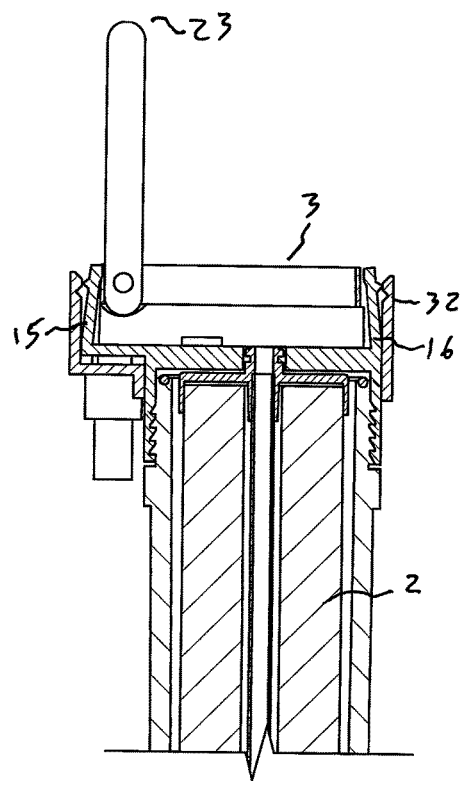
FIG. 4 shows a cross-section through part of a filter cartridge located within a bracket of a water dispenser in a unlocked position.
Figure 5:
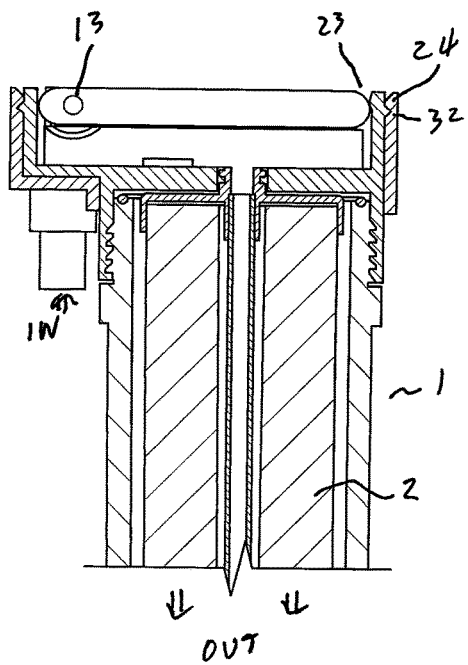
FIG. 5 shows the arrangement of FIG. 4 in a locked position.

As shown in FIG. 1, the cartridge comprises a generally cylindrical section filter body 1 which encloses a generally coaxial body of filter medium, such as carbon filter 2 (shown in FIGS. 3 to 5 for example). Carbon filters are known in themselves. A filter head 3 is mounted on the filter body. Typically, this are mounted by cooperating screw heads 4 and 5, such that the filter bag can be simply screwed to the filter body. When the carbon filter needs replacing the body can be unscrewed from the head and the carbon filter medium itself to remove. The filter head 3 includes internal cavities providing a water passage from an inlet 6 to an outlet 19 from where water can flow through the carbon filter 2 and exit from the bottom of the carbon filter 2. From here it can pass through the remainder of a water dispenser (not shown).

The bracket 7 includes a generally part cylindrical section portion 8 adapted to encompass the filter body and a generally U-shaped portion 9 bearing an inlet (or outlet) nozzle 25.

FIG. 1 also shows a bracket forming part of a water dispenser and into which the filter cartridge is located. Typically, it will be vertically located from above. The bracket may include a generally part cylindrical portion 8, adapted to encompass the filter body, and a generally U-shaped portion 9 on one side 25 bearing an inlet (or outlet) nozzle. The filter head 3 is provided with a locking mechanism for locking the head relative to the bracket (as will be described further below).

The bracket may be a separate item or may be an integral part of the housing or body of a water dispenser forming a bracket portion.

Figure 2:
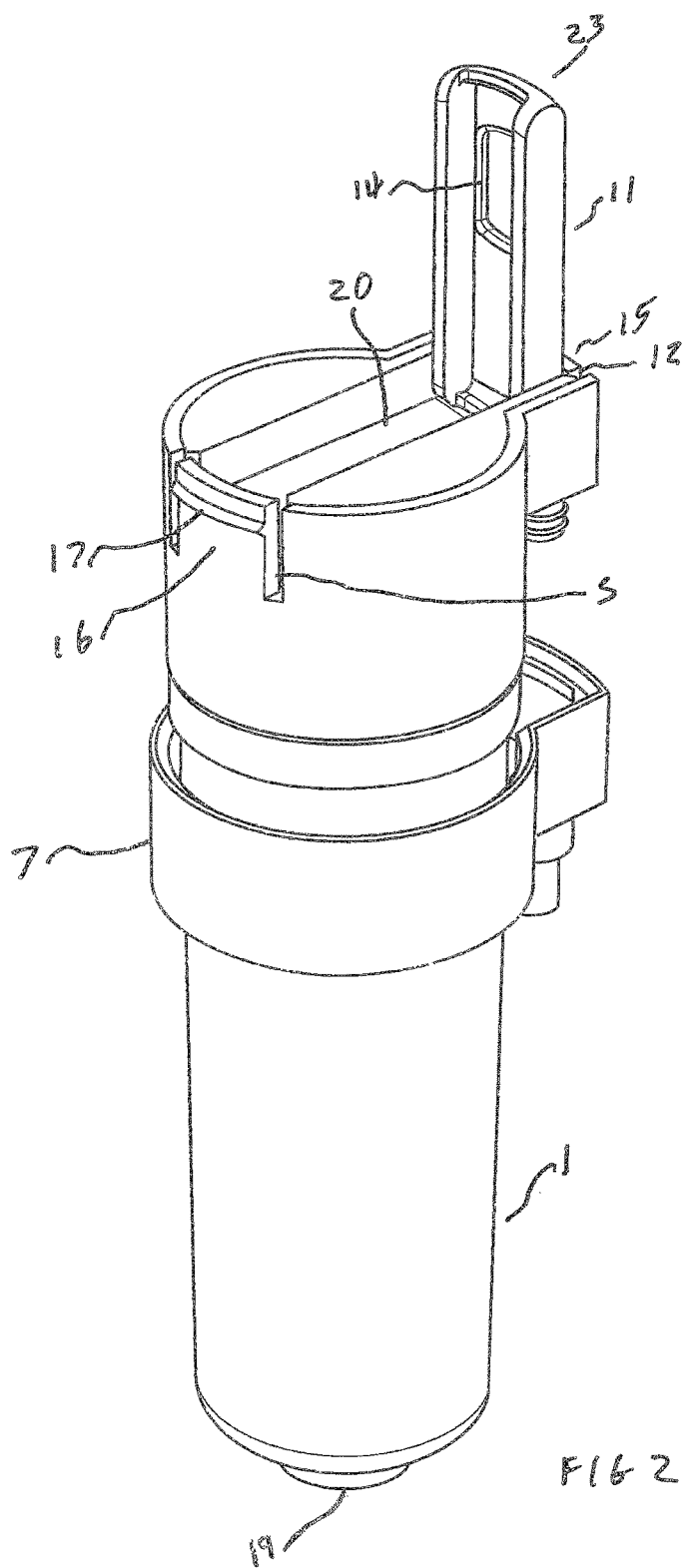
FIG. 2 shows a filter cartridge located within a bracket.

Referring to FIG. 2, the cartridge is shown partially pulled out from the bracket 7. The filter head includes, at its top surface, a lever 11 which is hingeably connected by a hinge (not shown in this figure) at one end 12 thereof and the hinge may be formed by a pin 13 extending through the lever 11 into a side wall, as is shown more clearly in FIGS. 3 to 5 for example. The lever may also include an orifice 14 which is preferably of suitable size that a finger can fit within it, thus enabling a lever, when moved to a position where its distal end extends outwards from the head, to be used as a handle by a user to lift the cartridge filter from the bracket. Whilst the through-hole orifice is useful, it is not essential in order for the lever to still be used as a handle. It does however greatly enable ease of use and reduce the chances of slippage. Two or more or no orifices may be used.

The filter head also comprises one or, preferably, two or more tabs 15, 16. These may be formed by providing cuts from the top surface of the side of part 8 as shown, or by providing slots S as shown, extending a distance from the top, or otherwise. In effect, this forms a resiliently deflectable tab 15, 16 having a proximal portion integral with the cylindrical side wall 8 and a distal portion which is resiliently deflectable laterally. Each tab is also provided with a lateral rib 17, 18 which protrudes outwardly. When the elongate axis of the filter cartridge assembly is vertical, these ribs will be generally horizontal in a preferred embodiment.

A first one of these tabs 15 is located adjacent the end 12 of the lever. Note that the lever is hingeably located in a recess 20 formed in the top surface 21 of the filter head. The tabs 15 and 16 in effect form the end boundaries of this recess and thus lie with their distal ends free to move inwardly with respect to the space defined by the recess. The lever 11 is hinged at a hinge point 13 which is spaced from the very end 22 of the lever so that as the lever is rotated a pin 30 the end 22 in effects forms a cam surface and pushes outwardly on the distal end of tab 15 if the distal end has been forced inwards. Similarly, the distal end 23 of the lever, when the lever is rotated to a closed position, (ie the closed position shown in FIG. 1) can push against tab 60 if the tab has been deflected inwardly, in order to push this outwardly, as is more clearly shown in FIGS. 3 to 5.

The mounting bracket 8 also includes diametrically opposite horizontal ribs 23, 24, of which rib 23 is provided in the side extending portion bearing a water inlet 25 and the other rib 24 is provided at the diametrically opposing part of the wall of the bracket 7. The head includes an inlet 6 which locates within inlet 25 of the bracket such that water which is provided to inlet 25 can flow inlet 6, through the body of the filter head and down through the filter 2. Alternatively, the direction of water flow could be reversed.

FIGS. 3 to 5 show more clearly how the filter cartridge can be located and locked with respect to a dispensing apparatus. As described, the dispensing apparatus may include a bracket 7 which should be a separate part of the apparatus or this may be integral part of the apparatus. The filter cartridge is first assembled by inserting a carbon filter 2 into the filter body and then attaching the filter head to the filter body by screwing these together using the two cooperating screw threads 4 and 5 (internal screw thread on the filter head and external screw thread on the body, or viceversa). With the lever in its open position, as shown in FIG. 3 (ie hinged upwardly), the filter cartridge is located within the bracket and lowered. The filter cartridge inlet then locates within the inlet 25 of the body. Once lowered into position, the tabs 15 and 16 of the filter cartridge are deflected inwardly slightly by the inwardly extending ribs 23 and 24 of the bracket pushing against the outwardly directed ribs 17 and 18 of the tabs. The distal end of tab 17 then is pushed towards so it is in contact with, or nearly in contact with, the lever 11, as shown in FIG. 4. By rotating the lever 11 about hinge 13, the end 22 acts as a cam and pushes on tab 16 to lock the rib into a recess 30 formed directly underneath rib 23. This then secures that side bracket (the left side in FIG. 4) into the correct position. As the lever continues to rotate its end 23 also pushes the resiliently deflected distal end of tab 16 into a position where rib 24 locates into a cooperating recess 32 directly underneath rib 24. This position is shown in FIG. 4 and at this position the filter cartridge is securely locked into position relative to the water dispenser and bracket. The use of the lever enables a strong force to be used to push the tabs into position within the slots and thus for a strong lock to be obtained.

Once the cartridge is in position, when water is applied to inlet 25 it passes through inlet 6 of the cartridge through an appropriate water channel within the cartridge and downwardly to the carbon filter where impurities are removed in known manner. The water then exits the carbon filter and may be directly dispensed or, in some embodiments, be passed through further filtration and/or purification systems for ultimate dispensing. It may also be heated by appropriate heating means and/or chilled. A combination of filters might also be applied. In some embodiments, a UV filtration means may be applied during the process and preferably this is applied at the very end of the process.

Figure 6:
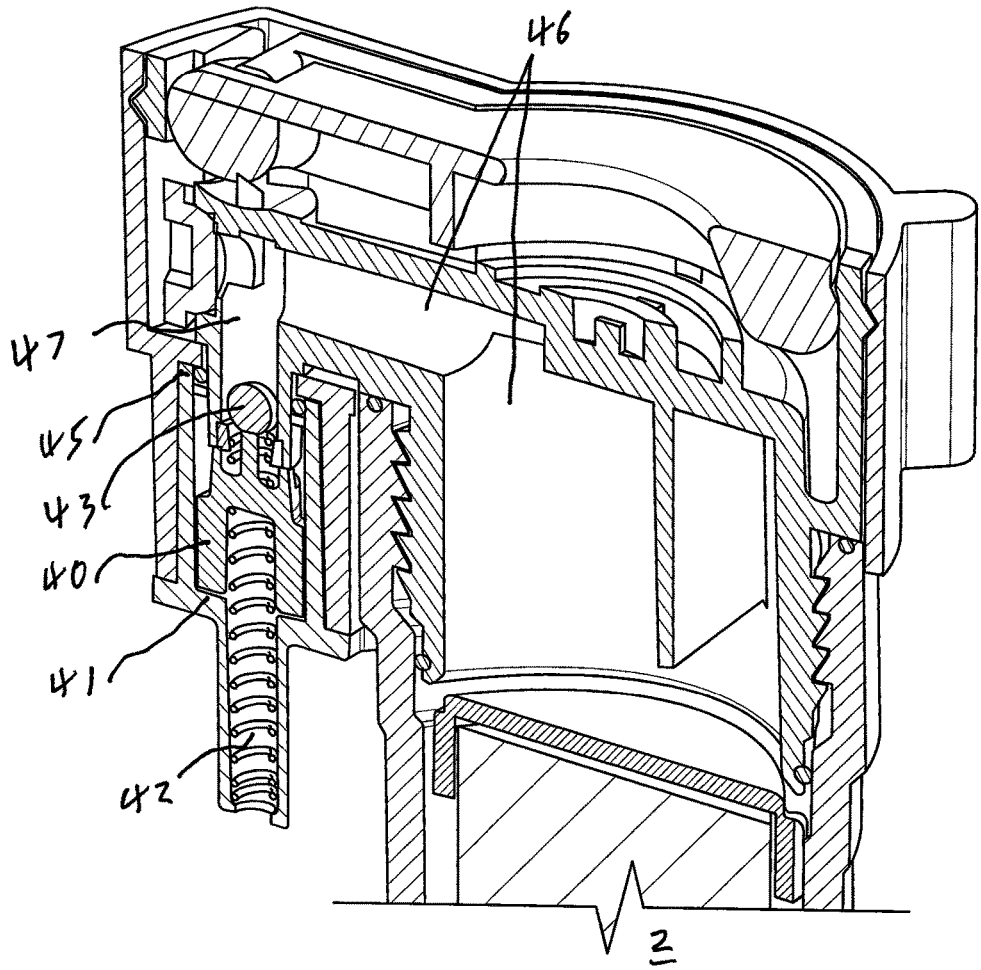
FIG. 6 shows a cross-section of part of a cartridge locked into a dispenser.
Figure 7:
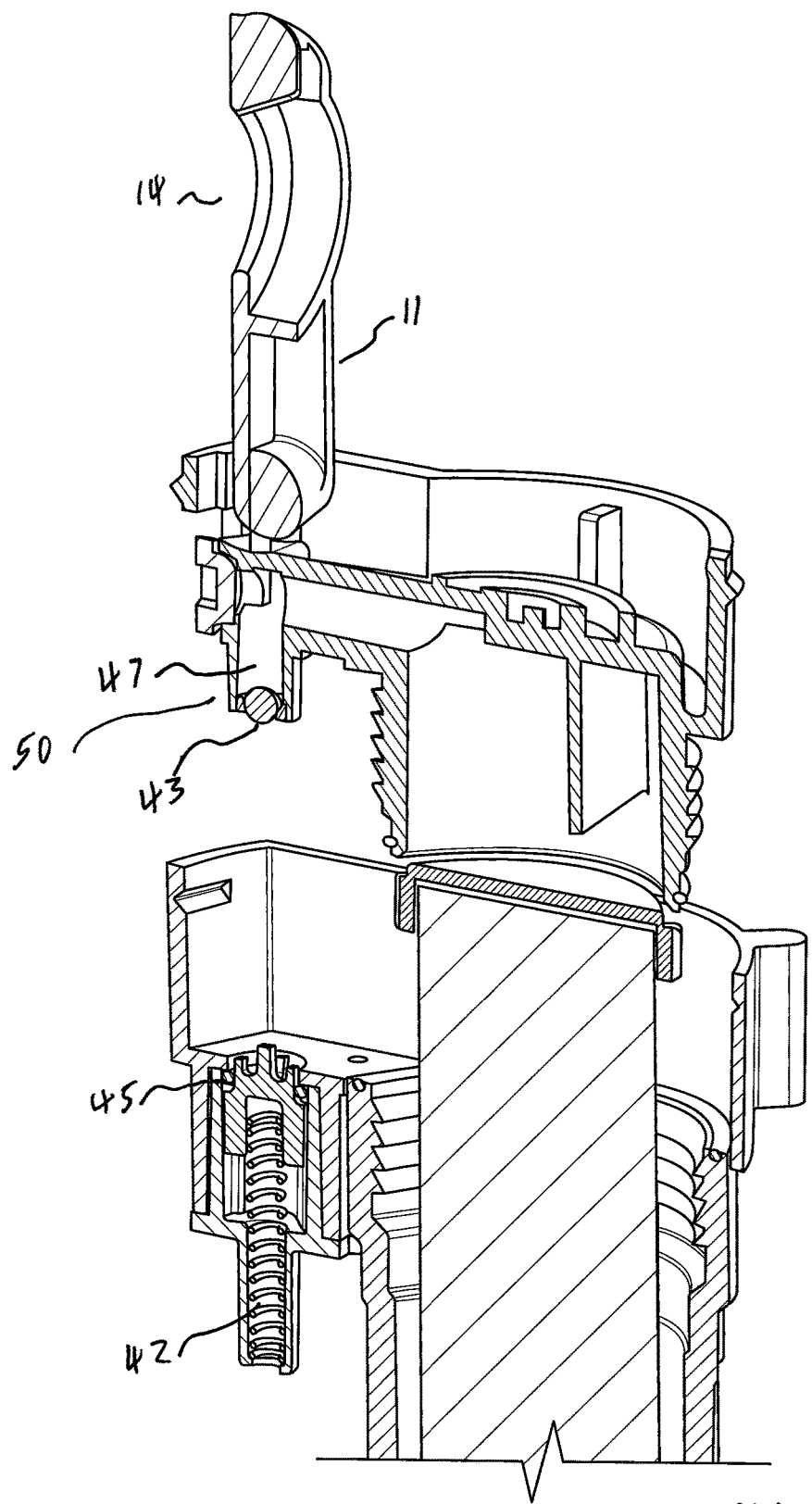
FIG. 7 shows a cartridge partially disassembled.

FIGS. 6 and 7 show in a little more detail a valve mechanism that may be used. Note that any convenient valve mechanism may be used for opening and closing the water path.

Thus, in embodiments, a 'snap-fit' mechanism is used to locate a filter cartridge within a dispensing apparatus. The cartridge can then be easily unlocked and removed for filter replacement.

FIGS. 6 and 7 show an example of a valve mechanism. The valve system comprises a valve 40 slidable, a junction 41 formed by the shoulder, a spring 42, a filter closing ball 43 and a sealing O-ring 45 and an abutment 50.

As shown in FIG. 6, when the filter is assembled the filter head presses down upon the moveable valve 40 to push this downwardly, against the spring force. This opens the passages and enables water flow from the junction 2 to filter 2, via the internal passages 46. At the same time, the valve presses the ball 43 upward into passage 47 and thus opens the water passage which can then flow pass the sides of the ball.

When disassembled, as shown in FIG. 7, the spring causes the water path to close from and to the junction. The closing ball, which is provided in the cartridge assembly, then sits against the bottom of the passage 47 and prevents any water from leaking out, and therefore out of the filter head.

Thus, the ball passages 47 and 46 form part of the filter head assembly which also includes the lever mechanism 11 and resiliently deflectable tab and the valve 40, spring 42 and junction assembly 41 form part of the bracket or other part of the housing or body of a dispensing apparatus. A water inlet such as a flexible or rigid hose, or conduit may be connected directly to inlet 6, via the inlet 25 which holds the spring 42 and the hose or conduit.

Other lever-operated mechanisms may be used for the lock/unlock mechanism.

The invention claimed is:

1. Liquid filtration apparatus, comprising a filter cartridge adapted to mount within a dispensing apparatus, the liquid filtration apparatus comprising a lever comprising a lever operated cam mechanism for locking and unlocking the cartridge into and out of place, wherein the cartridge comprises one or more resiliently deflecting tabs and the dispensing apparatus comprises one or more cooperating means for deflecting said one or more resiliently deflecting tabs inwardly, such that the lever acts upon the one or more resiliently deflecting tabs to cause the one or more resiliently deflecting tabs to resiliently deflect outward and inward to lock into and out of the cooperating means on the dispensing apparatus.

2. Apparatus as claimed in claim 1, wherein the lever is actuated in a first rotary direction to lock the cartridge in place relative to the dispensing apparatus and in a second rotary direction opposite to the first rotary direction to unlock the cartridge for removal from the dispensing apparatus.

3. Apparatus as claimed in claim 1, wherein the lever also comprises a handle for lifting the cartridge into or out of the dispensing apparatus.

4. Apparatus as claimed in claim 1, wherein the cartridge comprises a liquid flow path for enabling liquid, when the cartridge is locked into the cooperating means on the dispensing apparatus, to pass from an inlet, through a filter medium included within the cartridge and to exit from the filter medium.

5. Apparatus as claimed in claim 4, wherein the filter medium is a carbon filter.

6. Apparatus as claimed in claim 1, including means for removably inserting a filter medium within the cartridge.

7. Apparatus as claimed in claim 6, wherein the cartridge comprises a head portion and a body portion, the body portion adapted to retain the filter medium and the head portion and body portion being connectable to and disconnectable from each other to remove the filter medium.

8. Apparatus as claimed in claim 7, wherein the head portion and the body portion are connectable by cooperating screw threads.

9. Apparatus as claimed in claim 1, wherein the dispensing apparatus is a water dispenser comprising one or more ultraviolet sterilisation means.

10. Apparatus as claimed in claim 1, wherein the cooperating means on the dispensing apparatus comprises one or more resiliently deflecting tabs.

11. Apparatus as claimed in claim 10, wherein each of the one or more resiliently deflecting tabs on the dispensing apparatus comprises an inwardly directed rib.

12. Apparatus as claimed in claim 10, wherein the one or more resiliently deflecting tabs of the dispensing apparatus comprises an inwardly or outwardly directed rib.

13. Apparatus as claimed in claim 1, wherein the cooperating means comprises a recess enabling part of the one or more resiliently deflecting tabs to be locked into the recess.

14. Apparatus as claimed in claim 1, wherein the lever is hinged about a hinge towards a first end of the lever, and wherein the lever is operable such that as the lever moves from an open to closed position the first end of the lever closest to the hinge acts as a cam to deflect a first resiliently deflectable tab of the one or more resiliently deflectable tabs and a second end of the lever moves into a position where the second end deflects a second resiliently deflectable tab of the one or more resiliently deflectable tabs.

15. Apparatus as claimed in claim 1, wherein the resiliently deflectable tabs are inwardly deflected, by a means of the dispensing apparatus in which the cartridge is inserted, when acted upon by the lever.

16. Apparatus as claimed in claim 1, wherein each of the one or more resiliently deflecting tabs comprises an inwardly or outwardly directed rib.

17. A filter cartridge comprising means for receiving a filter medium, and a lever operated cam mechanism for locking and unlocking the cartridge into and out of a dispensing apparatus, the mechanism comprising one or more resiliently deflectable tabs configured to resiliently deflect outward for locking the cartridge into position relative to the dispensing apparatus and configured to resiliently deflect inward for unlocking the cartridge when acted upon by the lever operated cam mechanism.

18. A water dispenser adapted to receive a removable filter cartridge, comprising means for receiving part of the one or more resiliently deflectable tabs formed on the cartridge as claimed in claim 17 for holding the cartridge in the water dispenser.

19. A filter cartridge for a water dispenser, comprising:
a lever comprising a cam to lock and unlock the cartridge in place relative to a housing, the lever also acting as a handle to lift the cartridge out of the housing when unlocked; and
one or more resiliently deflecting tabs, wherein the lever is configured to act upon the one or more resiliently deflecting tabs to cause the one or more resiliently deflecting tabs to resiliently deflect outward and inward to lock into and out of the housing.

* * * * *